United States Patent [19]

Ben-Ghiath

[11] Patent Number: 5,666,227

[45] Date of Patent: Sep. 9, 1997

[54] PASSIVE PANORAMIC VIEWING SYSTEMS

[76] Inventor: Yehoshua Ben-Ghiath, 9 Narkissim, Kiryat Bialik 27100, Israel

[21] Appl. No.: 236,804

[22] Filed: May 2, 1994

[51] Int. Cl.⁶ .............................. G02B 5/08; G02B 27/14; B60R 1/00
[52] U.S. Cl. ........................... 359/630; 359/633; 359/839; 359/857; 359/861
[58] Field of Search .................... 359/843, 850, 359/855, 856, 857, 858, 861, 865, 872, 839, 629, 630, 633, 634, 638

[56] References Cited

U.S. PATENT DOCUMENTS

| | | | |
|---|---|---|---|
| 1,745,862 | 2/1930 | O'Rourke | 359/861 |
| 1,903,239 | 3/1933 | Leffland | 359/861 |
| 2,375,134 | 5/1945 | Ptacek | 359/861 |
| 3,208,343 | 9/1965 | Prochnow | 359/843 |
| 3,394,978 | 7/1968 | Muller | 359/861 |
| 3,827,788 | 8/1974 | Clark | 359/633 |
| 4,435,044 | 3/1984 | Hanin | 359/861 |
| 5,424,875 | 6/1995 | Davis, II | 359/855 |

FOREIGN PATENT DOCUMENTS

| | | | |
|---|---|---|---|
| 2524851 | 10/1983 | France | 359/855 |
| 1803363 | 6/1979 | Germany | 359/855 |
| 0143156 | 7/1985 | Japan | 359/866 |
| 1070598 | 6/1967 | United Kingdom | 359/855 |

*Primary Examiner*—Ricky D. Shafer
*Attorney, Agent, or Firm*—Mark M. Friedman

[57] ABSTRACT

Systems for affording panoramic forward, side, rear and underneath views to operators of a wide range of transportation means for facilitating safe manoeuvering thereof. The transportation means include private vehicles, full trailers, semi-trailers, busses, aircraft, ships and the like.

6 Claims, 12 Drawing Sheets

PASSIVE PANORAMIC VIEWING SYSTEMS

FIELD AND BACKGROUND OF THE INVENTION

The present invention relates to devices, assemblies and systems for affording panoramic forward, side, rear and underneath views for a wide range of transportation means including, private vehicles, full trailers, semi-trailers, buses, aircraft, ships and the like.

It is well known that blind spots hinder the safe manoeuvering of transportation means and are the cause of many accidents. Considerable inventive effort has been made over the years in developing devices, assemblies and systems particularly for private vehicles for overcoming blind spots. Typical examples include devices, assemblies and systems disclosed in U.S. Pat. Nos. 1,444,538 to Crooks, 1,877,997 to Shapiro et la., 1,905,323 to Wallace, 1,986,033 to Trufant, 2,075,900 to Jackson and 2,257,510 to Mote for viewing the area immediately behind the vehicle and U.S. Pat. Nos. 1,918,802 to Fleischer, 4,172,638 to Freedman, 4,309,142 to Shumaker and 4,441,790 to Williams et al. for viewing the area immediately in front of a vehicle. However, none of the above have achieved commercial success for a number of reasons including that they are detract from the aesthetic appearance of the vehicle, are cumbersome to install, are relatively complicated to align and to maintain in alignment, etc.

Typical blind spots of small vehicles include the areas towards the front of a vehicle, for example, when exiting from a road or a driveway to join a stream of traffic and towards the rear of the vehicle, for example, when reversing into a parking space.

Typical blind spots of long vehicles, for example, trailers and buses, also include, in addition to the above-mentioned front and rear blind spots, blind spots along the side of the vehicle and right and left areas substantially perpendicular to the sides of the vehicle. The problem of blind spots of long vehicles is even more acute for articulated vehicles, for example, semi-trailers, articulated buses, trams, etc. where part of the vehicle can extend over a pavement during certain maneuvers, for example, when making sharp turns.

Blind spots of civilian and military aircraft include the underside of the aircraft because the pilot does not have a visible line of sight. The blind spots are particularly troublesome while taxiing along a runway and landing when the pilot has to estimate the height of the aircraft aircraft's instrumentation does not provide readings for such short heights.

Therefore, it would be highly advantageous to have devices, assemblies and systems for affording panoramic forward, side, rear and underneath views to operators of a wide range of transportation means including, private vehicles, full trailers, semi-trailers, busses, aircraft, ships and the like.

SUMMARY OF THE INVENTION

The main object of the present invention is to afford panoramic forward, side, rear and underneath views to operators of a wide range of transportation means for facilitating safe manoeuvering thereof and thereby prevent accidents.

Hence, according to a first aspect of the present invention, there is provided a bi-directional mirror for augmenting a driver's forward field of view, comprising: (a) a first mirror visible from the driver's normal sitting position for reflecting the image of an area towards the left of the driver's forward field of view; and (b) a second mirror visible from the driver's normal sitting position for reflecting the image of an area towards the right of the driver's forward field of view.

The mirrors are preferably slightly downwardly inclined to reflect images of areas towards the downward left and right of the driver's field of view. The mirrors can be flat mirrors, horizontally convexly curved mirrors or both horizontally and vertically convexly curved mirrors. Preferably, the mirrors subtend a from about 30° to about 100° angle therebetween.

According to a second aspect of the present invention, there is provided a bi-directional mirror for augmenting a driver's rear field of view as afforded by the standard rearview mirror of a vehicle, comprising: (a) a first mirror for reflecting an image of an area towards the left of the driver's rear field of view wherein the image is visible in the rearview mirror; and (b) a second mirror for reflecting the image of an area towards the right of the driver's rear field of view wherein the image is visible in the rearview mirror. The mirrors are preferably slightly downwardly inclined to reflect images of areas towards the downward left and right of the driver's field of view. The mirrors are flat mirrors, horizontally convexly curved mirrors, or both horizontally and vertically convexly curved mirrors. The mirrors preferably subtend a from about 30° to about 100° angle therebetween.

According to a third aspect of the present invention, there is provided a system for affording an image of an area to the side of a vehicle, comprising: (a) first image projection means for projecting an image of the area to the side of a vehicle; and (b) second image projection means in optical alignment with the first optical means such that the image is visible from the driver's normal sitting position. The second image projection means projects images of areas both to the right and left sides of the vehicle. The second image projection means can include mirrors mounted on the side of the vehicle, mirrors mounted underneath the vehicle or mirrors mounted within the body of the vehicle and viewing through apertures. In the case of mirrors mounted underneath the vehicle or within its body, the second image projection means typically include periscopes.

The system can be adapted for implementation on an articulated vehicle by extending mirrors along the length of the rear section of the articulated vehicle or, in the case of the use of periscopes, by including image correction means for correcting images projected from the rear section of the articulated vehicle when either the articulated vehicle turns a corner or goes over a hill.

According to a fourth aspect of the present invention, there is provided a system for affording an image of an area to the rear of a vehicle, comprising: (a) first image projection means for projecting an image of the area to the rear of a vehicle; and (b) second image projection means in optical alignment with the first optical means such that the image is visible from the driver's normal sitting position. The first image projection means includes at least one mirror for affording an image of an area to the rear of a vehicle and at least beam splitter for affording an image of an area to the rear of a vehicle.

According to a fifth aspect of the present invention, there is provided a system for affording an image of an area to the underside of an aircraft, comprising: (a) first image projection means for projecting an image of the area to the underside of the aircraft; and (b) second image projection means in optical alignment with the first optical means such that the image is visible from the pilot's normal sitting position. The system can further include third image projecting means for projecting an image of the area to the front of the aircraft.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of systems for affording panoramic forward, side, rear and underneath views to operators of a wide range of transportation means for facilitating safe manoeuvering thereof.

The present invention can be better understood with reference to the drawings and the accompanying description.

Figure 1A:
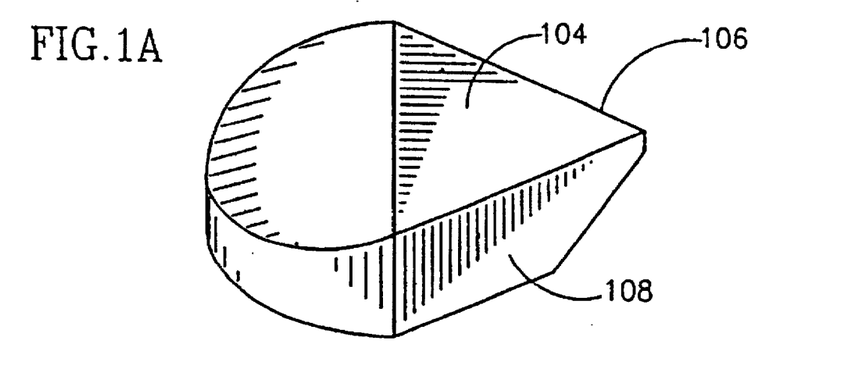
FIGS. 1a and 1b show two embodiments of bi-directional mirrors for augmenting a driver's forward field of view and constructed and operative according to the teachings of the present invention.
Figure 1B:
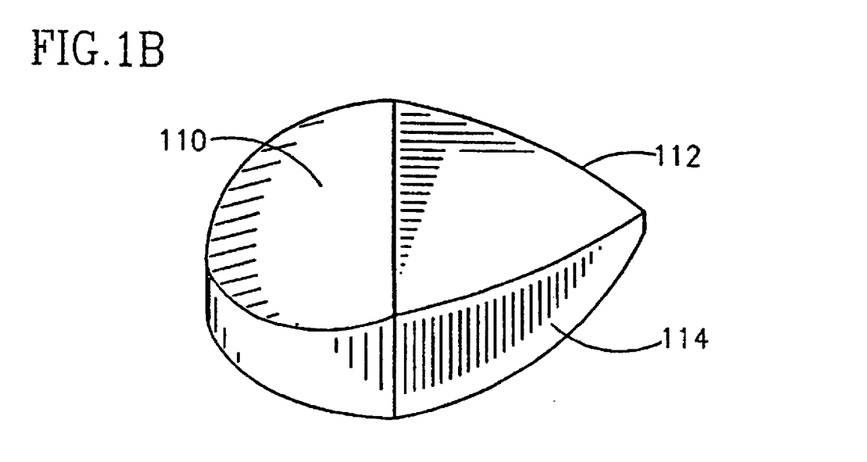
Figure 1C:
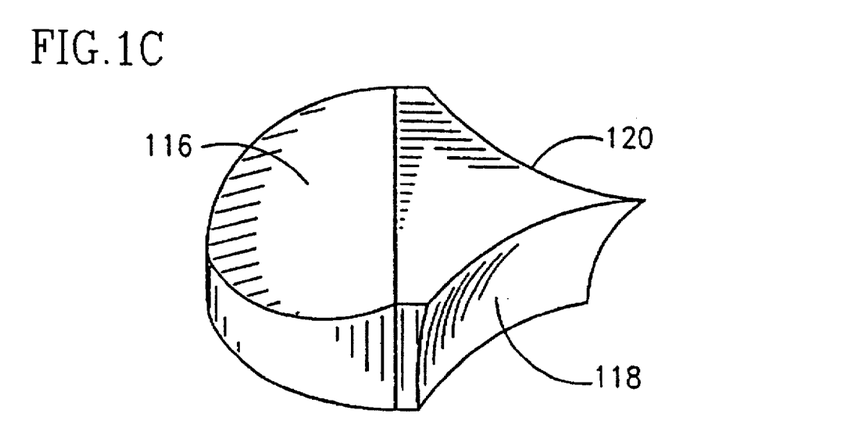
FIG. 1c shows a third embodiment of a bi-directional mirror for augmenting a driver's rear field of view as afforded by a standard rearview mirror constructed and operative according to the teachings of the present invention.

Referring now to the drawings, FIGS. 1a and 1b show two bi-directional mirrors for augmenting a driver's forward field of view while FIG. 1c shows a bi-directional mirror for augmenting a driver's rear field of view as afforded by a standard rearview mirror 102 of a vehicle 100. Vehicle 100 can be any one of a wide range of vehicles in which the driver sits in a spaced apart relationship from the from of the vehicle.

Figure 1D:
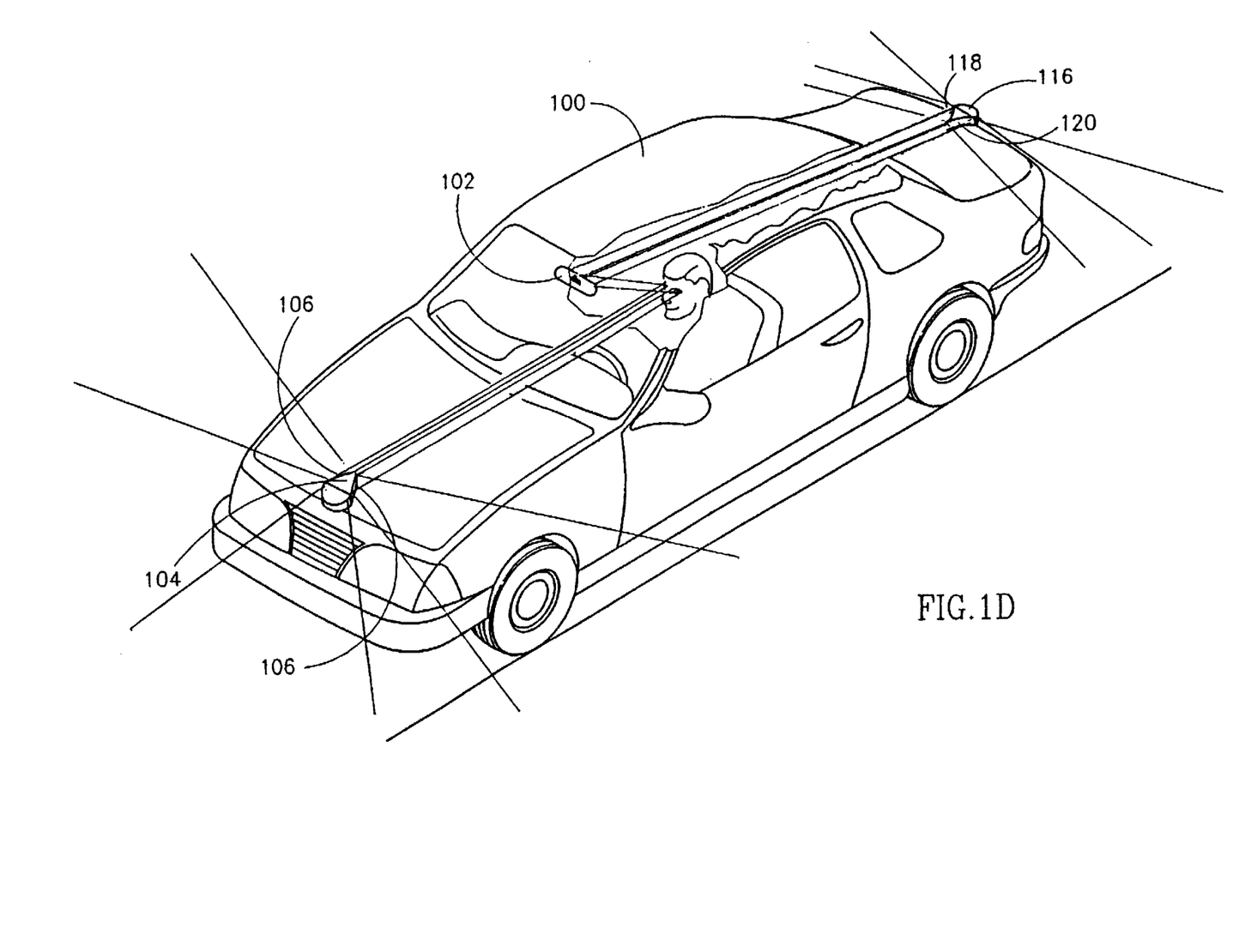
FIG. 1d is a plan view of the additional fields of view afforded to the driver of a vehicle equipped with the bi-directional mirrors of the present invention.

FIGS. 1a and 1d show a bi-directional mirror 104 for mounting at the front of vehicle 100 such that it is visible from the driver's normal sitting position. Bi-directional mirror 104 includes a pair of plane mirrors 106 and 108 subtending from about 30° to about 100° angle therebetween. Hence, mirror 106 faces towards the rear right of vehicle 100 for reflecting the image of the area towards the right of the driver's forward field of view while mirror 108 faces towards the rear left of vehicle 100 for reflecting the image of the area towards the left of the driver's forward field of view. Mirrors 106 and 108 are preferably slightly downwardly inclined at an angle from about 10° to about 40° to reflect images of the areas towards the downward right and left of the driver's forward field of view.

FIG. 1b shows a bi-directional mirror 110 similar to mirror 104 for augmenting a driver's forward field of view except that bi-directional mirror 110 includes horizontally convexly curved mirrors 112 and 114, instead of plane mirrors 106 and 108, for reflecting the images of the areas towards the right and left of the driver's forward field of view, respectively. To facilitate reflection of images of the areas towards the downward right and left of the driver's field of view, mirrors 112 and 114 are preferably convexly curved in the vertical plane as well as in the horizontal plane.

FIGS. 1c and 1d show a bi-directional mirror 116 for augmenting the driver's rear field of view as afforded by rearview mirror 102. Bi-directional mirror 116 includes a pair of mirrors 118 and 120 such that mirrors 118 and 120 face towards the forward right and left of vehicle 100, respectively, for affording images of the area toward the right and left of the of the driver's rear field of view, respectively. It is a particular feature of bi-directional mirror 116 that mirrors 118 and 120 are horizontally concavely curved such that an object situated on the right side and towards the front of vehicle 100 is viewed in rearview mirror 102 further to the right while an object situated on the left side and towards the front of vehicle 100 is viewed in rearview mirror 102 further to the left. To facilitate reflection of images of the areas towards the downward right and left of the driver's field of view, mirrors 118 and 120 are preferably concavely curved in the vertical plane as well as in the horizontal plane.

Figure 1E:
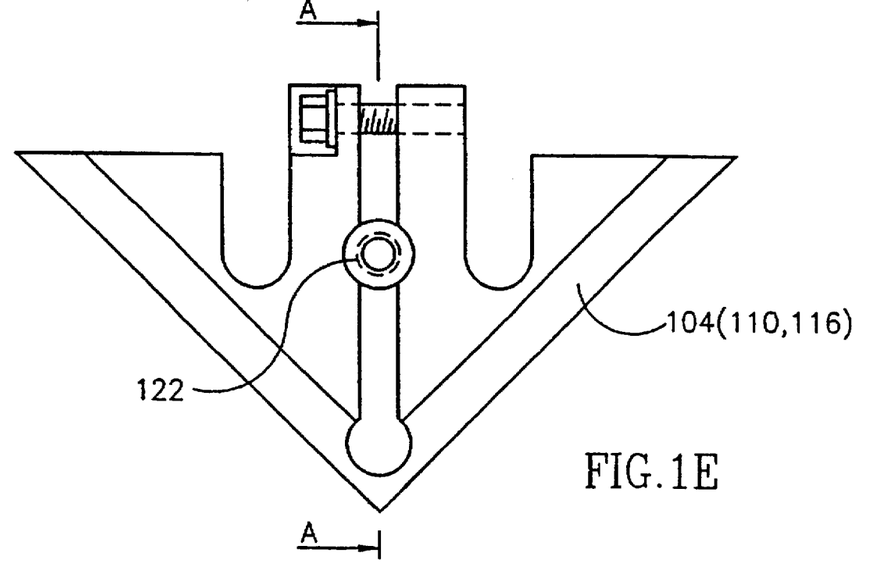
FIGS. 1e and 1f show how the bi-directional mirrors are mounted to a vehicle.
Figure 1F:
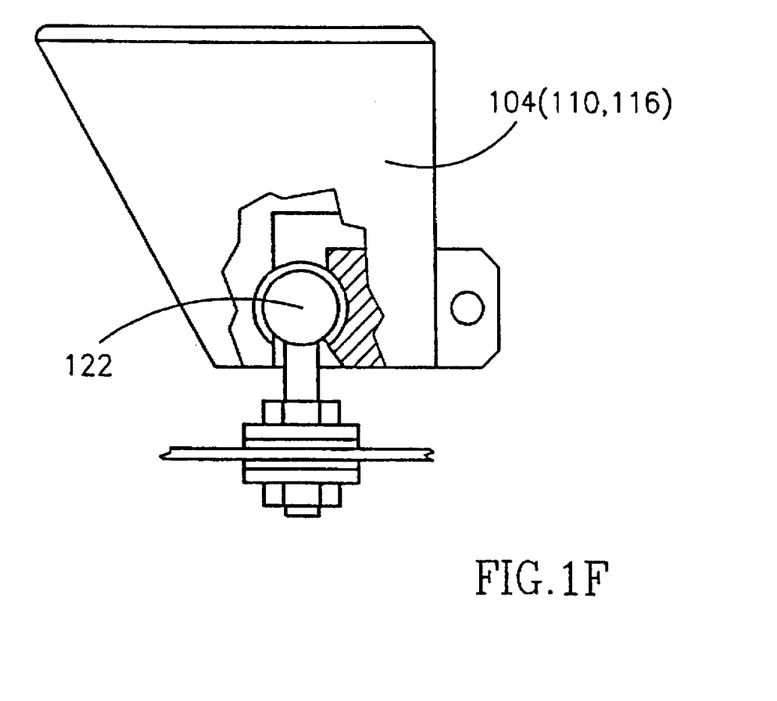

With reference now to FIGS. 1e and 1f, the manner in which bi-directional mirrors 104, 110 and 116 are mounted on vehicle 100 is shown. Mirrors 104, 110 and 116 are typically mounted using a ball-and-socket joint 122 which enables mirrors 104, 110 and 116 to be adjusted both horizontally and aligned such that the angles of the mirrors are settable by the driver according to his personal preferences, his vehicle, etc. Bi-directional mirrors 104, 110 and 116 are engineered so as to not detract from the aesthetic design of a vehicle, obscure a driver's forward front of view, etc. and can be fabricated from either silvered glass, plastic material or highly polished metal with a reflective surface as known in the art. Furthermore, it can be readily appreciated that, bi-directional mirrors 104, 110 and 116 can be customized to accommodate different distances from the front of a vehicle to its driver's normal sitting position and the different heights of the tops of the fronts of the vehicles from the ground.

Figure 1G:
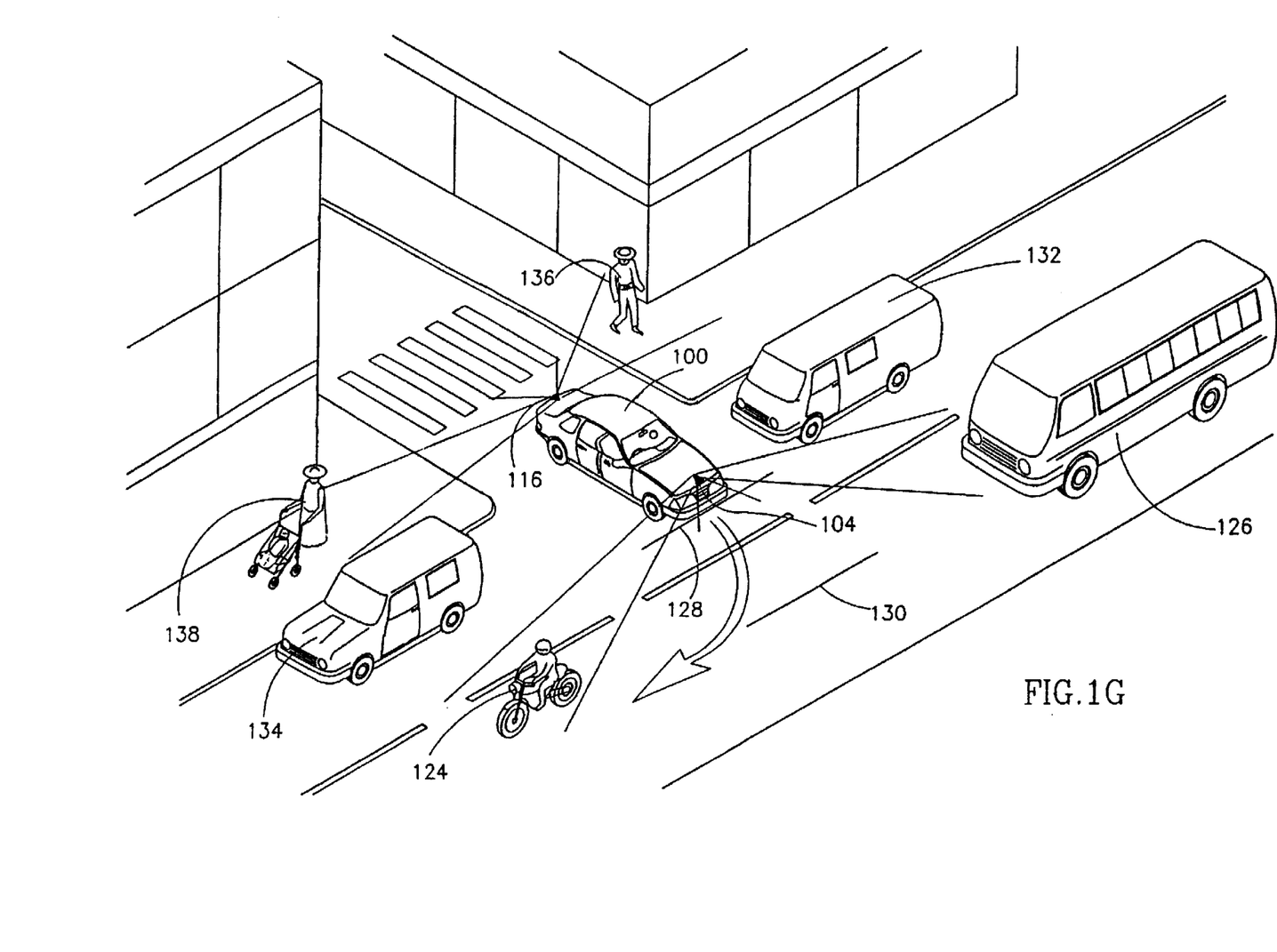
FIG. 1g shows how the use of the bi-directional mirrors of the present invention augment the forward and rearward fields of view of a driver in a typical driving environment.

Overall, the use of bi-directional mirror 104 is shown in FIG. 1g in which it enables the driver of vehicle 100 to view a motorcycle 124 and a bus 126 from a position denoted by line 128 rather than from a danger prone position denoted by line 130 due to vehicles 132 and 134 obstructing his normal forward field of view from line 128. Furthermore, FIG. 1g also shows the use of bi-directional mirror 116 enables the driver to view pedestrian 136 and 138 on both sides of vehicle 100.

Figure 2A:
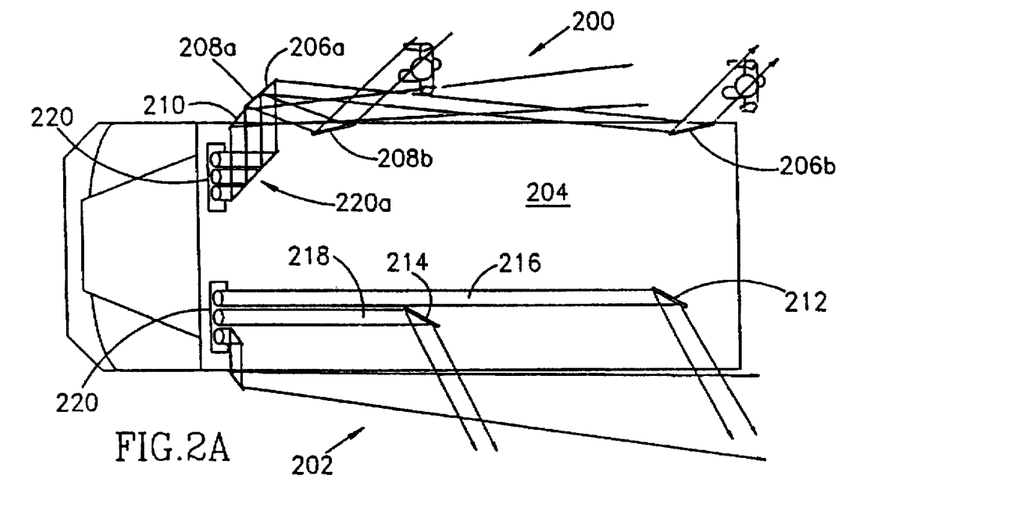
FIG. 2a shows a schematic optical diagram of systems constructed and operative according to the teachings of the present invention for affording images of areas to the sides of long vehicles.
Figure 2B:
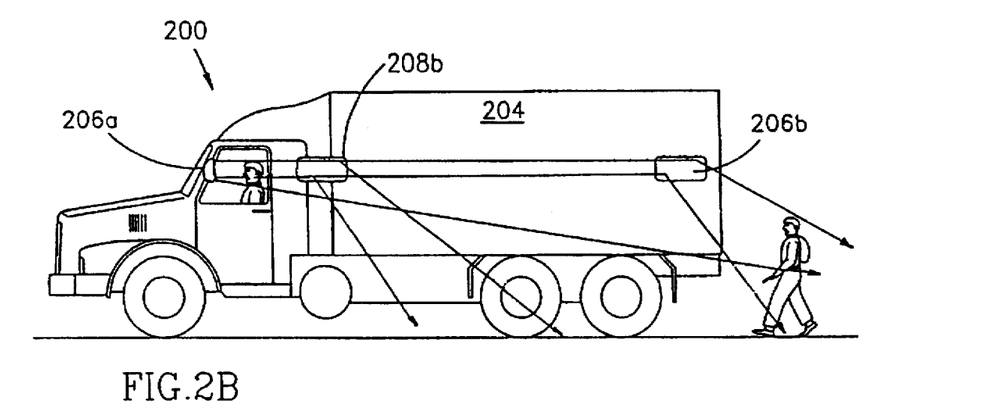
FIGS. 2b and 2c show right and left side views of a vehicle equipped with systems for affording images of areas to the sides thereof.
Figure 2C:
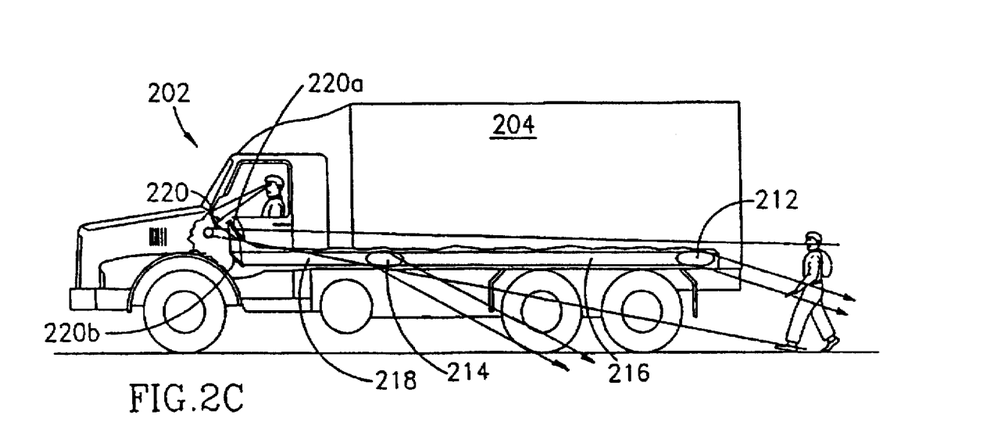

With reference now to FIGS. 2a–2c, there are shown two systems, generally designated 200 and 202, for affording the driver of a long vehicle 204, for example, a truck, a bus, etc., images of areas to the sides of the vehicle. Broadly speaking, system 200 includes mirrors mounted on the side of vehicle 204 while system 202 includes mirrors located either underneath vehicle 204.

Hence, system 200 includes sets 206 and 208 of pairs of mirrors (206a,206b) and (208a,208b) for affording the driver of vehicle 204 a view to the right of vehicle 204. Mirrors 206b and 208b are deployed so as to project images to mirrors 206a and 208a in optical alignment therewith for viewing by a driver glancing towards the right of his normal sitting position. Mirrors 206a and 208a can be deployed either as single flat mirrors together with a mirror 210 such that together they project a substantially continuous image of the area to the right of vehicle 204 or they can be combined as a panoramic mirror. Mirrors 206b and 208b can be installed at any height from the height of the chassis to the top of a vehicle.

In a similar fashion, system 202 includes mirrors 212 and 214 deployed along the left side of vehicle 204 for affording the driver of vehicle 204 a view to the left of vehicle 204. Mirrors 212 and 214 are preferably situated underneath the chassis of the body of vehicle 204 and project images through periscopes 216 and 218 onto a display 220 visible from the driver's normal sitting position. Alternatively, the mirrors 212 and 214 can be mounted within the body of vehicle 204 and viewing through apertures.

With reference now to FIGS. 3a–3e, there are shown five systems, generally designated 300–308, for affording images of areas to the rear of a long vehicle 310 to its driver. Broadly speaking, systems 300–308 include combinations of beam splitters and mirrors for enabling two or more views to be projected along either a single periscope 312 (see FIGS. 3d and 3e) or right and left periscopes 314 and 316 (see FIGS. 3a–3c) onto a display 318 visible from the driver's normal sitting position. Systems 300–308 typically employ one or more rotatable beam splitters or mirrors mounted on an axis 319 such that a driver can have view a user selectable field of view.

Alternatively, single periscope 312 or right and left periscopes 314 and 316 can project images onto mirrors such that the images to the right and left of the rear of vehicle 310 can be viewed by the driver glancing towards the right and left of his normal sitting position, respectively. Periscopes 312, 314 and 316 can be deployed either underneath or within vehicle 310 depending on the type of vehicle. The mirrors can be either flat mirrors or panoramic mirrors which can be either fixedly or rotatably mounted. The beam splitters are preferably either 45/55% or 25/75% beam splitters depending on the location of the beam splitter and the views to be projected, however, other beam splitters can be employed.

Figure 3A:
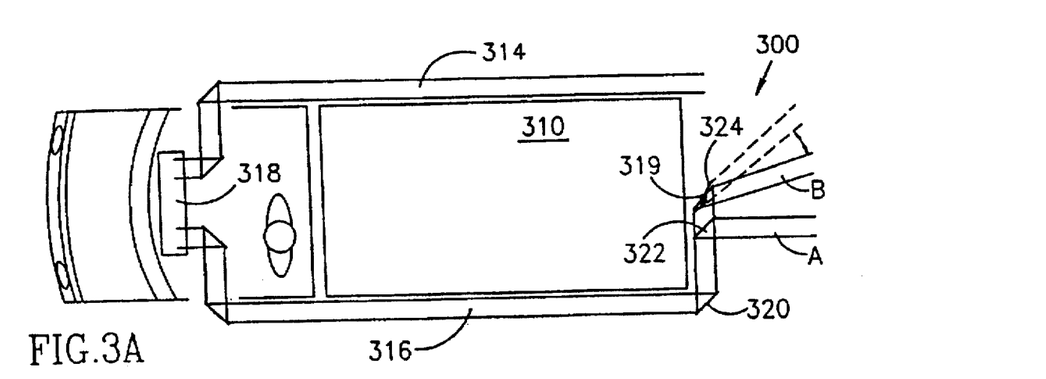
FIGS. 3a–3e are schematic optical diagrams of systems constructed and operative according to the teachings of the own present invention for affording images of areas to the rear of long vehicles.

FIG. 3a shows system 300 including periscope 316 in optical alignment with a mirror 320 and a beam splitter 322 deployed at the rear of vehicle 310. Mirror 324 is deployed distant from mirror 320 such that it projects an image of an area denoted B through beam splitter 322 onto display 318 while beam splitter 322 projects an image of an area denoted A onto display 318. Together, beam splitter 322 and mirror 324 can project from about 90° to about 130° field of view of the area to the rear of vehicle 310.

Figure 3B:
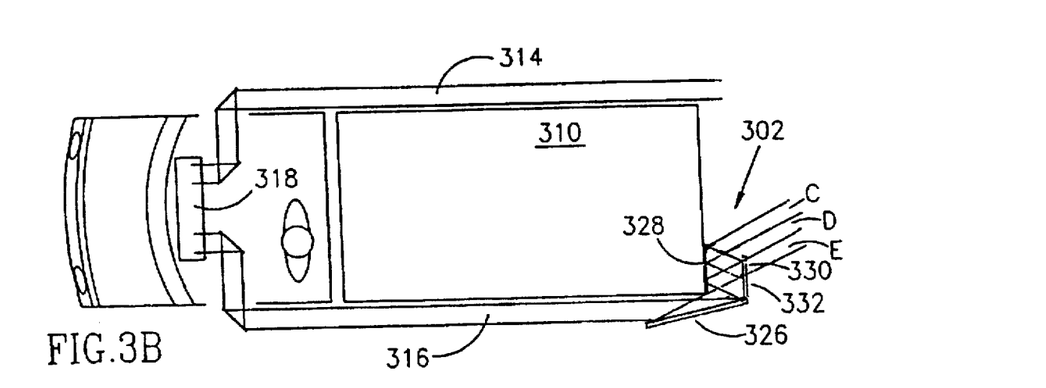

FIG. 3b shows system 302 including periscope 316 in optical alignment with a mirror 326, a mirror 328, a beam splitter 330 and a mirror 332 wherein mirror 332 is adjacent to mirror 326 and beam splitter 330 is adjacent to mirror 332 such that an L shaped is formed. Mirror 328 projects images of areas denoted C, D and E via beam splitter 330 and mirror 332 onto mirror 326 for projection onto display 318.

Figure 3C:
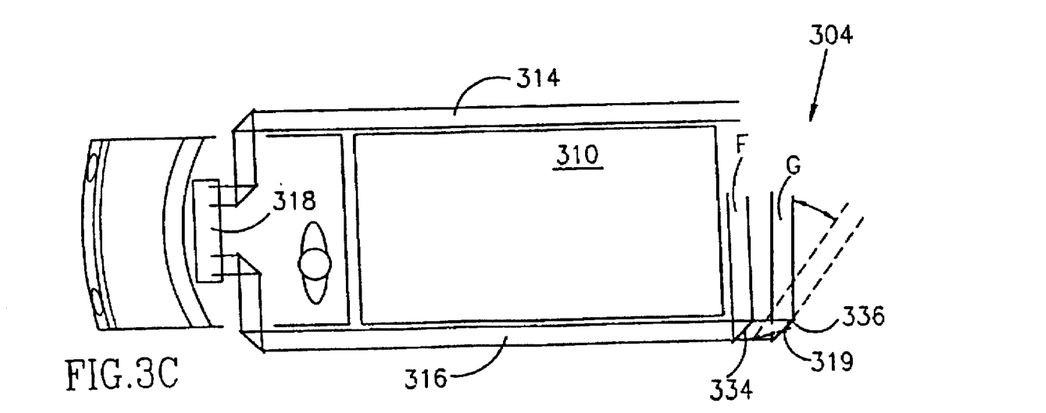

FIG. 3c shows system 304 including periscope 316 in optical alignment with a beam splitter 334 and a mirror 336 deployed at the rear of vehicle 310. Mirror 316 is deployed distant from periscope 316 for projecting an image of an area denoted G via beam splitter 334 onto display 318 while beam splitter projects an image of an area denoted F onto display 318. Together, beam splitter 334 and mirror 336 can project about 80° field of view of the area to the rear of vehicle 310.

Figure 3D:
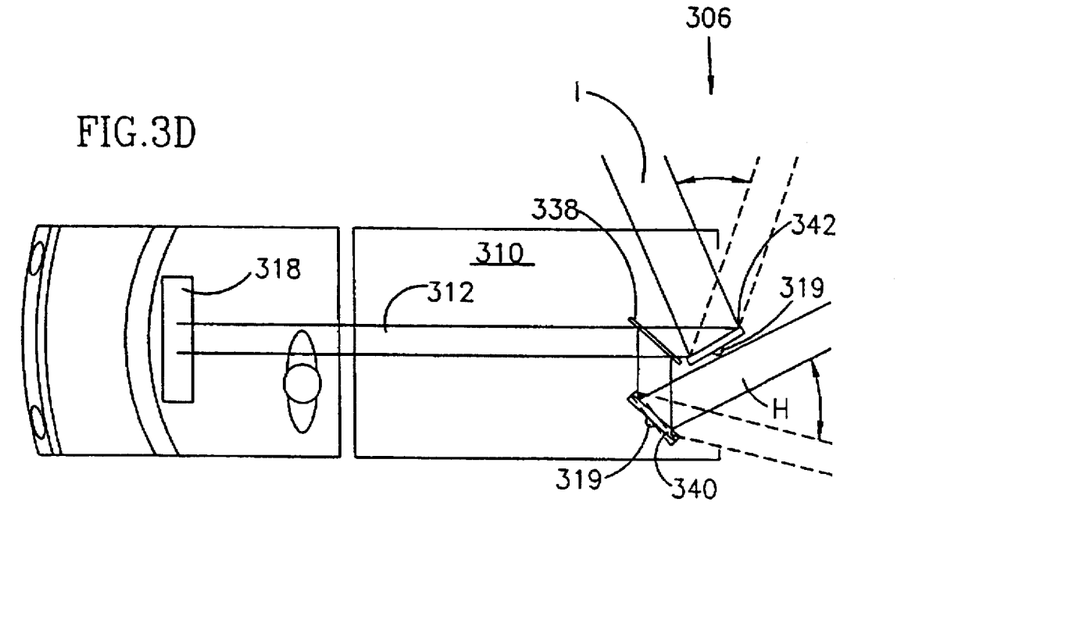

FIG. 3d shows system 306 including periscope 312 in optical alignment with a beam splitter 338 deployed at about 45° to the axis of vehicle 310. Beam splitter 338 is, in turn, in optical alignment with a mirror 340 and a mirror 342 for projecting images of areas denoted H and I from mirrors 340 and 342, respectively, onto display 318. Mirrors 340 and 342 can be rotatably mounted for manipulation by the driver to facilitate scanning of the area to the rear of vehicle 310.

Figure 3E:
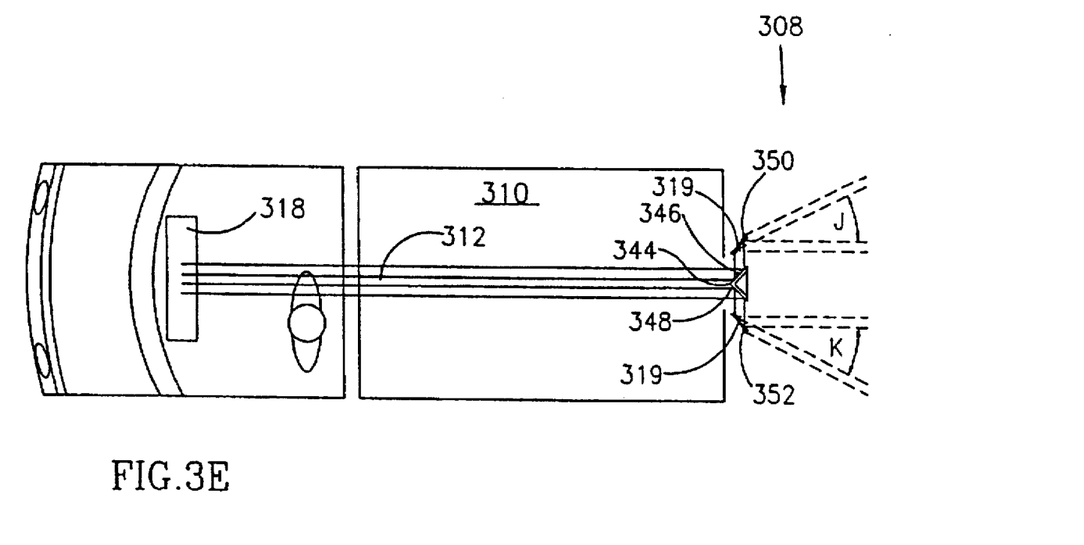

FIG. 3e shows system 308 including periscope 312 in optical alignment with a bi-directional mirror 344 in the form of bi-directional mirror 104 (see FIG. 1a) having mirrors 346 and 348. Bi-directional mirror 344 is, in turn, in optical alignment with a mirror 350 which faces mirror 346 for projecting onto display 318 an image of an area denoted J and with a mirror 352 which faces mirror 348 for projecting an image of an area denoted K onto display 318. Mirrors 350 and 352 can be rotatably mounted for manipulation by the driver to facilitate scanning of the area to the rear of vehicle 310.

With reference now to FIGS. 4a–4d, there are shown systems, generally designated 400 and 402 for affording images of areas to the sides of an articulated vehicle 406, for example, a semi-trailer, articulated bus, etc., having front and rear sections 408 and 410, to its driver. Broadly speaking, systems 400 and 402 are systems 200 and 202 adapted for articulated vehicles. In effect, the extra functionality required by systems 400 and 402 over their counterpart systems for long vehicles is that systems 400 and 402 are required to project images of views from rear section 410 of vehicle 406 to the driver sitting in front section 408 while vehicle 406 executes maneuvers including up to 90° turns. Furthermore, systems 400 and 402 are required to project images from rear section 410 of vehicle 406 when articulated vehicle 406 is going over a hill, etc.

Figure 4A:
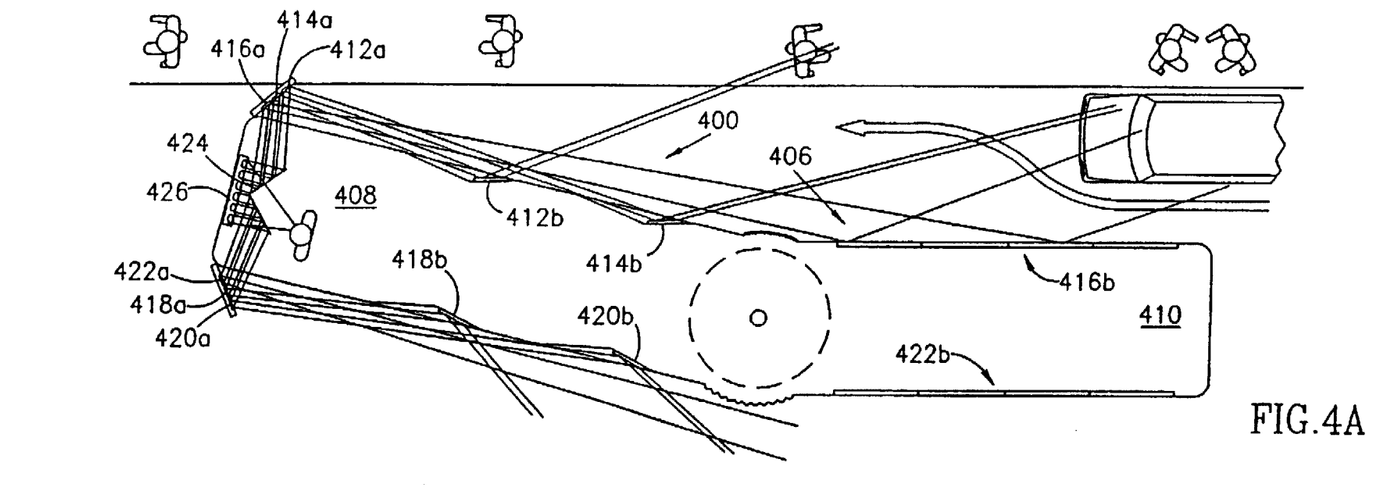
FIGS. 4a–4f are schematic optical diagrams of systems constructed and operative according to the teachings of the present invention for affording images of areas to the sides and to the rear of articulated vehicles.
Figure 4B:
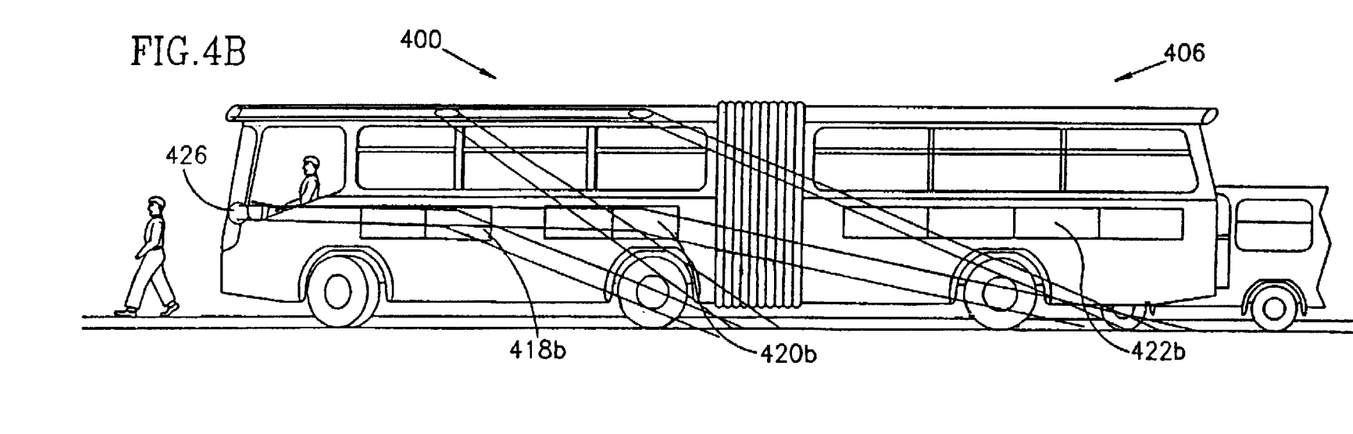

FIGS. 4a and 4b show system 400 including sets 412 and 414 of pairs of mirrors (412a,412b) and (414a,414b) for affording the driver of vehicle 406 a view to the right of front section 408 and a set 416 of pair of mirrors (416a,416b) for affording the driver of vehicle 406 a view to the right of the rear section 410 of vehicle 406. In a similar fashion, system 400 includes sets 418, 420 and 422 of pairs of mirrors (418a,418b), (420a,420b) and (422a,422b) for affording the driver of vehicle 406 a view to the left of front section 408 and rear section of vehicle 406.

Mirrors 412a, 414a and 416a are preferably mounted on a frame attached to the right of front section 408 such that the images projected by mirrors 412b, 414b and 416b can be viewed by the driver glancing towards the right of his normal sitting position. In a similar fashion, mirrors 418a, 420a and 422a are preferably mounted on a frame attached to the left of from section 408 such that the images projected by mirrors 418b, 420b and 422b can be viewed by the driver glancing towards the left of his normal sitting position.

However, preferably, the images from mirrors 412a, 414a and 416a are projected toward a display 424 while the images from mirrors 418a, 420a and 422a are projected toward a display 426.

It is a particular feature of the present invention that mirrors 416b and 422b extend substantially along the length of rear section 410 such that mirrors 416a and 422a remain in optical alignment with mirrors 416b and 422b, respectively, over a wide range of angles subtended between front section 408 and rear section 410 as articulated vehicle 406 executes maneuvers of up to 90° turns.

Figure 4C:
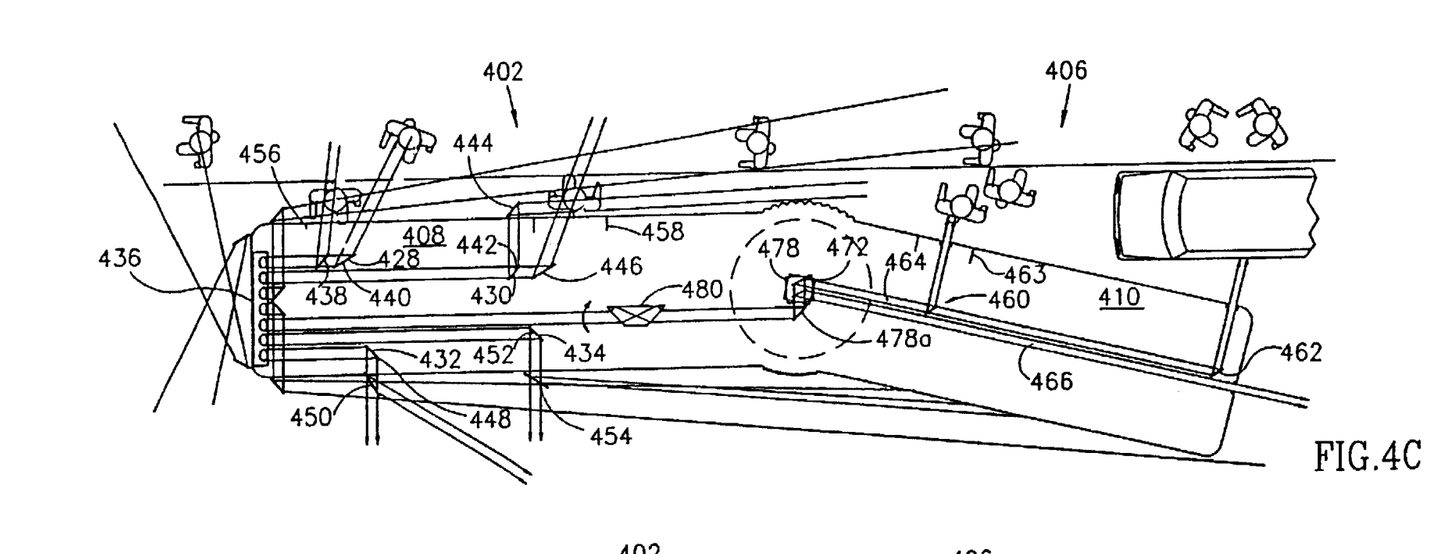
Figure 4D:
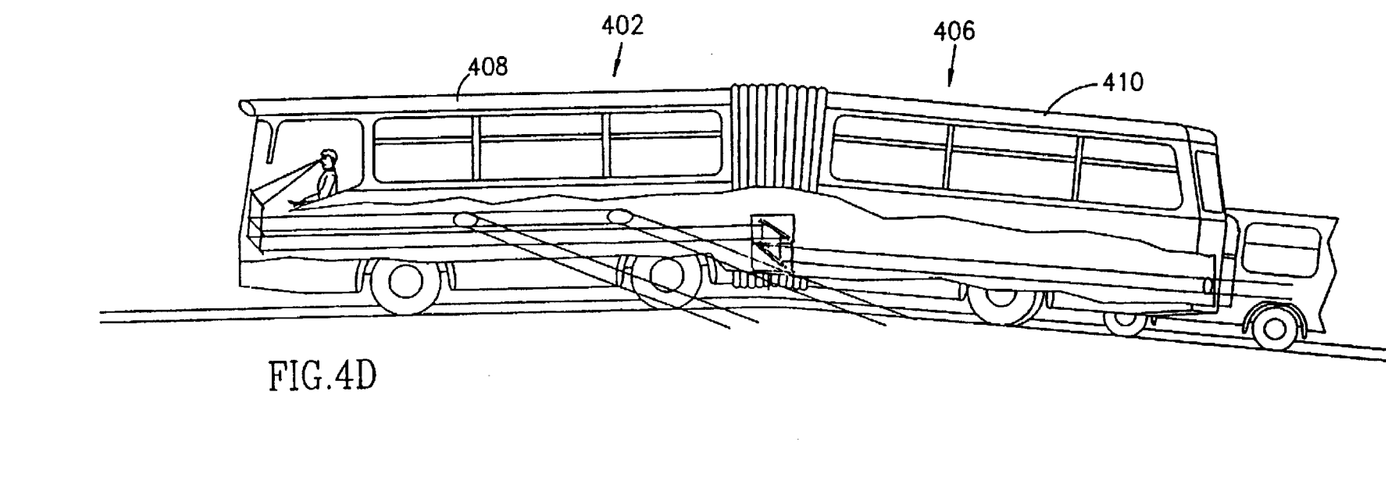

FIGS. 4c and 4d show system 402 including assemblies 428 and 430 for affording the driver views to the right of from section 408 and assemblies 432 and 434 for affording the driver views to the left of front section 408 onto a display 436 visible from the driver's normal sitting position. Assemblies 428-434 can include either single mirrors, combinations of mirrors or combinations of mirrors and beam splitters. Hence assembly 428 includes a beam splitter 438 and a mirror 440, assembly 430 includes a beam splitter 442 and two mirrors 444 and 446, assembly 432 includes a mirror 448 and a beam splitter 450 while assembly 434 includes a mirror 452 and a beam splitter 454.

A particular feature of system 402 when implemented for buses is that the assemblies on the right side of vehicle 406, in this case, assemblies 428 and 430, can be deployed to provide images of passengers entering and leaving bus 406. As shown, assembly 428 provides images of people entering bus 406 through entrance 456 while assembly 430 provides images of people leaving bus 406 from exit 458.

In addition, system 402 also includes assemblies 460 and 462 for affording the driver of vehicle 408 a view to the right of rear section 410 of vehicle 406 and, in particular, of people exiting from exit 463. The projection of images from assemblies 460 and 462 is achieved by periscopes 464 and 466, respectively. Periscopes 464 and 466 include an assembly, generally designated 470, adapted to execute two corrections as described hereinbelow with reference to FIGS. 4e and 4f.

Hence, assembly 470 includes a mirror 472 mounted on rear section 410 for receiving images from mirrors 474 and 476, mirrors 478 and 480 on front section 408, and a rotatably mounted dove prism 482 (FIG. 4e) or hollow prism device 484 (FIG. 4f) deployed between mirror 480 and display 436. The optical path of an image projected from mirror 474 includes reflection from mirror 472 in a downward direction onto mirror 478, reflection from mirror 478 in a sideway direction onto mirror 480, reflection from mirror 480 through dove prism 482 or hollow prism device 484 for correction onto display 436.

Figures 4E, 4F:
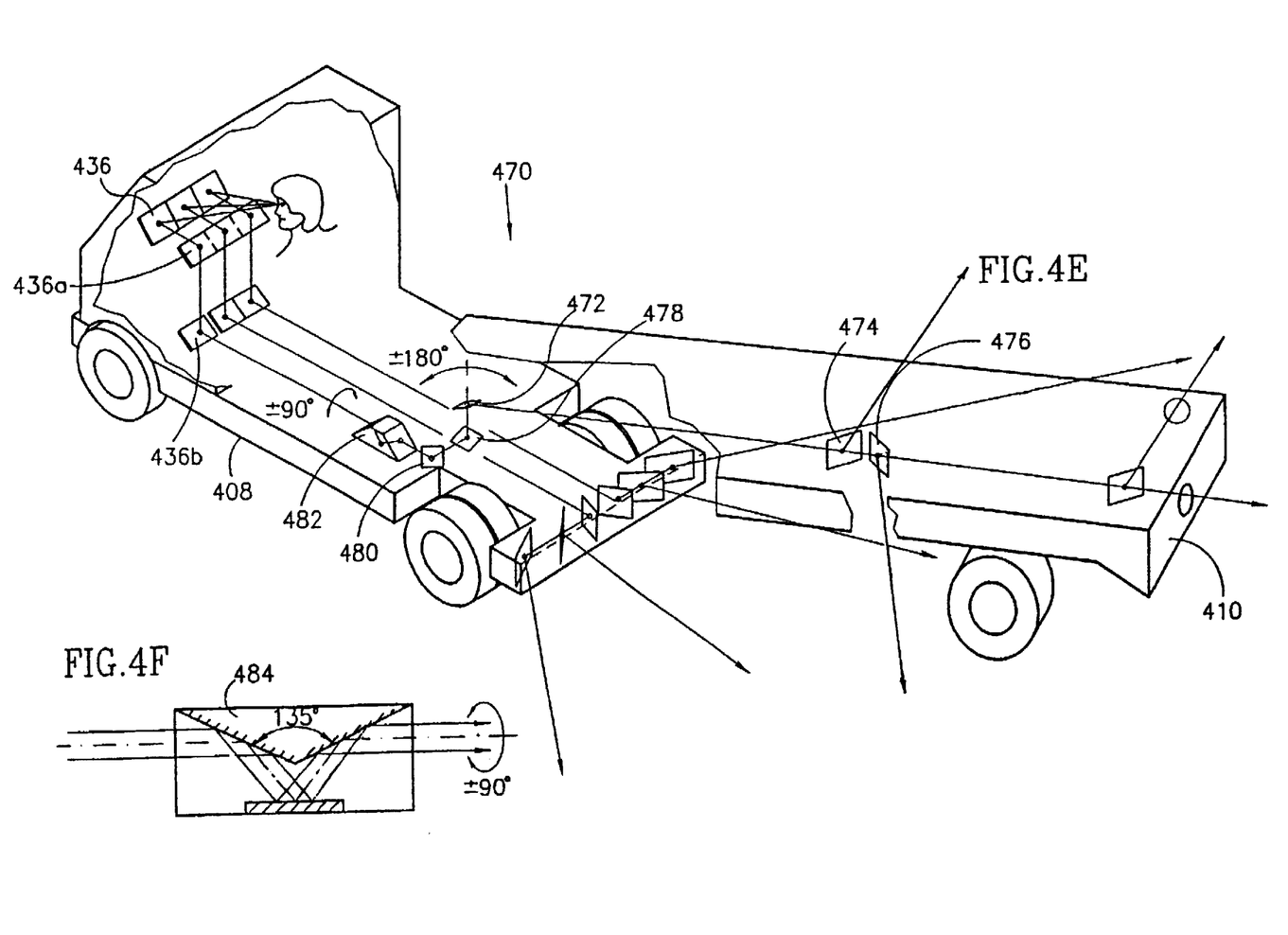

Dove prism 482 or hollow prism device 484 are rotatably mounted for compensating for the angular rotation of front section 408 with respect to rear section 410 as articulated vehicle 406 turns corners, etc. In effect, compensation is achieved by dove prism 482 or hollow prism device 484 rotating half of the angular rotation of front section 408 with respect to rear section 410. Compensation for the displacement of images between mirrors 472 and 478 when articulated vehicle 406 is going over a hill, etc, is best achieved by flexibly mounting either one of mirrors 472 and 478.

Figure 5A:
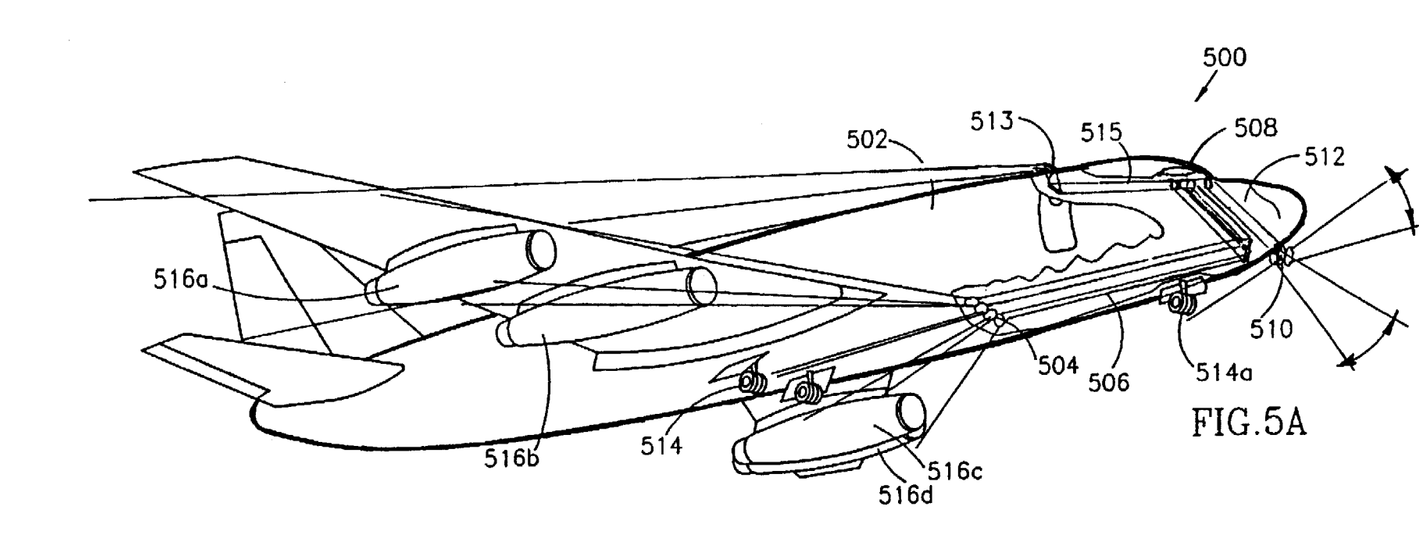
FIGS. 5a–5d are schematic optical diagrams of systems constructed and operative according to the teachings of the present invention for affording images of areas to the underneath of aircraft.
Figure 5B:
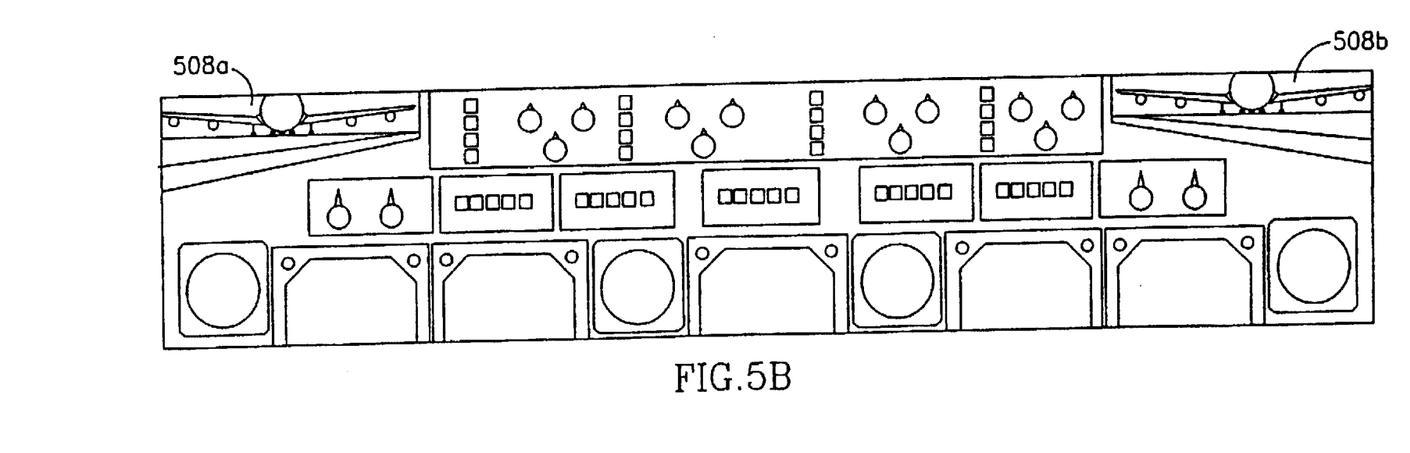

With reference now to FIGS. 5a and 5b, there is shown a system, generally designated 500, for affording images of areas to the underneath of aircraft 502. System 500 includes a battery of mirrors 504 in optical alignment with a periscope 506 for projecting images of the undercarriage 514 and the engines 516a-516d of aircraft 502 onto a display 508 having a left screen 508a for the pilot and a right screen 508b for the co-pilot. System 500 includes a second battery of mirrors 510 and a periscope 512 for projecting images of the front of airplane 502 onto display 508. System 500 can still further include a third battery of mirrors 513 and a periscope 515 for viewing rearward along the body of aircraft 502, for example, for viewing an engine.

Figure 5C:
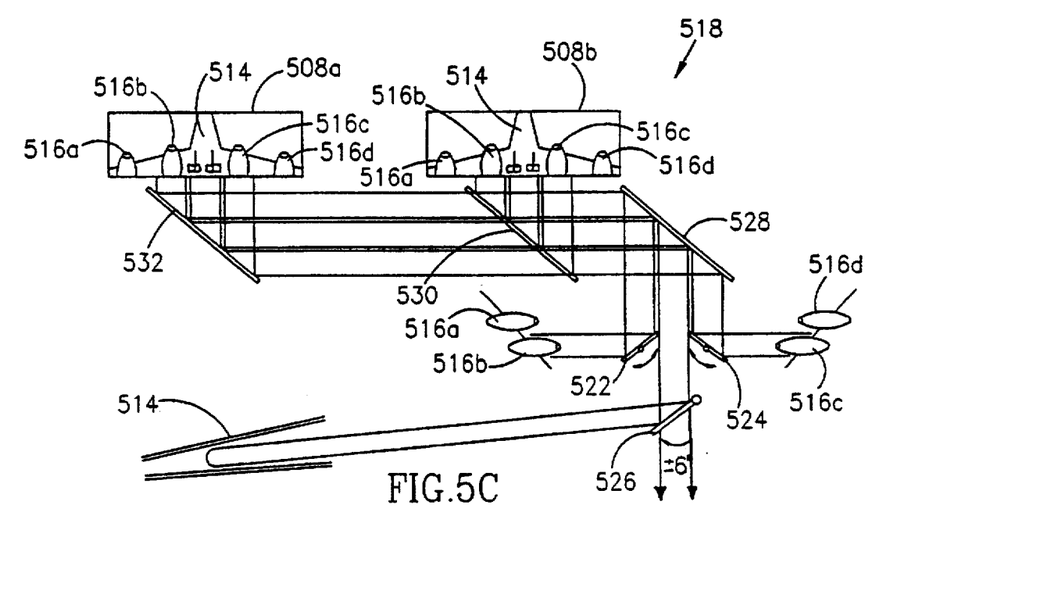
Figure 5D:
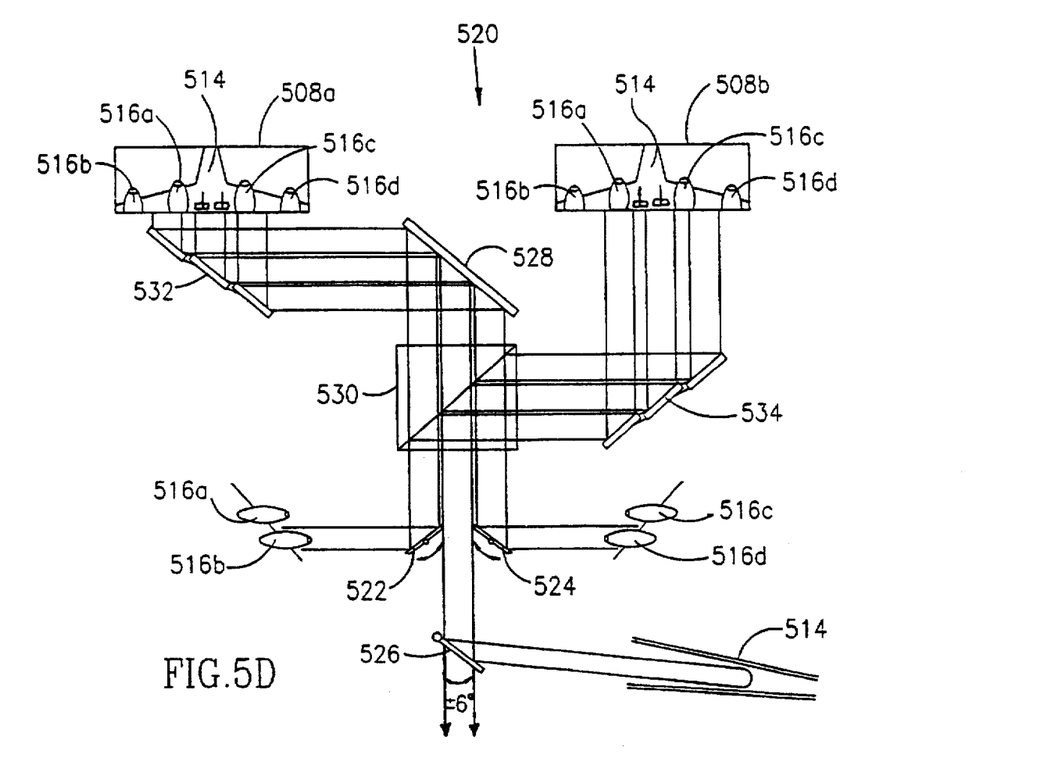

With reference now to FIGS. 5c and 5d, two possible embodiments of assemblies, generally designated 518 and 520, for incorporation into periscope 506 for projecting the images from battery of mirrors 504 to displays 508a and 508b are shown. Assemblies 518 and 520 both include mirrors 522 and 524 for viewing engines 516 and a beam splitter 526 for viewing undercarriage 514.

In assembly 518, mirrors 522 and 524 and beamsplitter 526 project via a mirror 528 images onto display 508b through a beam splitter 530 and onto display 508a through a mirror 532. While, in assembly 520, mirrors 522 and 524 and beam splitter 526 project images via a beamsplitter 530 onto display 508a using a mirror 528 and onto display 508b using a mirror 534.

While the invention has been described with respect to a preferred embodiment, it will be appreciated that many variations, modifications and other applications may be made.

What is claimed is:

1. A system for affording to a driver an image of a first area and a second area adjacent to a vehicle, the system comprising:

(a) first image projection means including a beam splitter, said first image projection means projecting a first image of the first area adjacent to the vehicle by transmission through said beam splitter and a second image, superimposed on said first image, of the second area adjacent to the vehicle by reflection from said beam splitter; and (b) second image projection means in optical alignment with said first image projection means such that said images are visible from the driver's normal sitting position.

2. The system as in claim 1, wherein said first image projection means includes at least one mirror for affording an image of an area to the rear of a vehicle.

3. The system as in claim 1, wherein at least a part of said first image projection means is rotatably mounted.

4. The system as in claim 1, wherein the vehicle is an articulated vehicle having a front section and a rear section, and wherein the first image projection means is associated with said rear section of the articulated vehicle and said second image projection means is associated with said front section of the articulated vehicle, the system further comprising intermediate optics interposed in optical alignment between said first image projection means and said second image projection means, said intermediate optics maintaining alignment between said first image projection means and said second image projection means when the front section of the articulated vehicle is rotated relative to the rear section.

5. The system as in claim 4, wherein said intermediate optics includes image correction means for correcting angular rotation of the image projected from said first projection means resulting from rotation of the front section of the articulated vehicle relative to the rear section.

6. The system as in claim 4, wherein said intermediate optics includes a flexibly mounted mirror.

* * * * *